United States Patent
Zeng et al.

(10) Patent No.: US 8,608,989 B2
(45) Date of Patent: Dec. 17, 2013

(54) FIRE RETARDANT MATERIALS AND METHODS

(75) Inventors: Changchun Zeng, Tallahassee, FL (US); Chuck Zhang, Tallahassee, FL (US); Ben Wang, Atlanta, GA (US); Richard Liang, Tallahassee, FL (US); Chase Knight, West Pensacola, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 13/411,040

(22) Filed: Mar. 2, 2012

(65) Prior Publication Data

US 2012/0222812 A1 Sep. 6, 2012

Related U.S. Application Data

(60) Provisional application No. 61/448,763, filed on Mar. 3, 2011.

(51) Int. Cl.
*C09K 21/02* (2006.01)
*C09K 21/06* (2006.01)
*C09K 21/14* (2006.01)
*C09J 5/00* (2006.01)
*B82Y 30/00* (2011.01)

(52) U.S. Cl.
USPC .......... 252/601; 252/602; 252/606; 252/608; 252/609; 524/436; 524/437; 524/441; 524/447; 524/495; 524/496; 977/742; 977/773; 977/902; 977/750; 977/752

(58) Field of Classification Search
USPC .......... 252/601, 602, 606, 608, 609; 524/436, 524/437, 441, 447, 495, 496; 977/742, 750, 977/752, 773, 902
See application file for complete search history.

(56) References Cited

U.S. PATENT DOCUMENTS

| | | | | |
|---|---|---|---|---|
| 6,706,793 B2 * | 3/2004 | Abu-Isa et al. | ............... | 524/409 |
| 7,182,888 B2 * | 2/2007 | Terada et al. | ................ | 252/511 |
| 2003/0158314 A1 * | 8/2003 | Abu-Isa et al. | ............... | 524/409 |
| 2004/0094750 A1 * | 5/2004 | Widagdo et al. | .............. | 252/500 |
| 2007/0215841 A1 * | 9/2007 | Ford et al. | ..................... | 252/503 |
| 2009/0022651 A1 * | 1/2009 | Tani et al. | .................. | 423/447.1 |
| 2009/0148637 A1 * | 6/2009 | Zhang et al. | ................. | 428/34.5 |
| 2010/0025879 A1 * | 2/2010 | Widagdo et al. | .............. | 264/104 |
| 2010/0227070 A1 * | 9/2010 | Grunlan | ......................... | 427/352 |
| 2011/0253330 A1 * | 10/2011 | Zhang et al. | .................. | 162/124 |
| 2012/0222812 A1 * | 9/2012 | Zeng et al. | .................... | 156/324 |

OTHER PUBLICATIONS

Gui et al., 2007, "Effect of Dispersion of Nano-Magnesium Hydroxide on the Flammability of Flame Retardant Composites," Composites Science and Technology, 67(6):974-980.

Gui et al., 2007, "Flame Retardant Synergism of Rubber and Mg(OH)2 in EVA Composites," Polymer, 48 (9):2537-2541.

(Continued)

*Primary Examiner* — Joseph D Anthony
(74) *Attorney, Agent, or Firm* — Sutherland Asbill & Brennan LLP

(57) ABSTRACT

Fire retardant materials are provided that contain carbon nanotubes and particles capable of endothermically reacting when exposed to elevated temperatures. The carbon nanotubes may be a buckypaper. Methods also are provided for making a fire retardant material and for improving the fire retardation capabilities of a material.

7 Claims, 9 Drawing Sheets

(56) References Cited

OTHER PUBLICATIONS

Huang et al., 2006, "Effect of Particle Size on Flame Retardancy of Mg(OH)2-filled Ethylene Vinyl Acetate Copolymer Composites," Journal of Applied Polymer Science, 100(6):4461-4469.

Liu et al., 1998, "Fullerene Pipes," Science, 280(5367):1253-1256.

Laoutid et al., 2009, "New Prospects in Flame Retardant Polymer Materials: From Fundamentals to Nanocomposites," Materials Science and Engineering: R: Reports, 63(3):100-125.

Lv et al., 2007, "Flame Retardancy and Mechanical Properties of EVA Nanocomposites Based on Magnesium Hydroxide Nanoparticles/Microcapsulated Red Phosphorous," Journal of Applied Polymer Science, 105(2):333-340.

Wang et al., 1996, "Microstructure and Mechanical-Properties of Ternary Phase Polypropylene/Elastomer/Magnesium Hydroxide Fire-Retardant Compositions," Journal of Applied Polymer Science, 60(9):1425-1436.

Wu et al., 2008, "Fire Retardancy of a Buckypaper Membrane," Carbon, 46(8):1164-1165.

Wu et al., 2010, "Study of Fire Retardant Behavior of Carbon Nanotube Membranes and Carbon Nanofiber Paper in Carbon Fiber Reinforced Epoxy Composites," Carbon, 48(6):1799-1806.

\* cited by examiner (a)

(b)

FIRE RETARDANT MATERIALS AND METHODS

CROSS-REFERENCE TO RELATED APPLICATIONS

This application claims priority to U.S. Provisional Patent Application No. 61,448,763, filed Mar. 3, 2011, which is incorporated herein by reference.

FIELD OF THE INVENTION

This invention relates generally to fire retardant materials, methods for making fire retardant materials, and methods for improving the fire retardation capability of materials.

BACKGROUND

Many polymeric materials often present fire hazards due to their highly combustible nature. Usually, this is related to their chemical structures, which, in many polymers, consist mostly of hydrogen and carbon (see Laoutid, F. et al., MATERIALS SCIENCE AND ENGINEERING: R: REPORTS 63(3) 2009, 100-25). Therefore, it is desirable to improve the fire performance of these materials—especially for various applications where fire safety is a concern.

Generally, improvements in fire performance may be achieved by reducing the availability of one or more of the essential elements that sustain the combustion cycle (i.e., the fire triangle): combustibles (reducing agent, typically organic volatiles from decomposition of the polymer), combustives (oxidizing agent, typically oxygenation in air), and heat.

Previous research has demonstrated that when applied to the surface of polymer matrix composites, carbon nanotube (CNT) buckypapers may serve as an effective fire retardant shield and may reduce fire hazard (see Wu, Q. et al., CARBON 46(8) 2008, 1164-5; Wu, Q. et al., CARBON 48(6) 2010, 1799-806). Buckypapers are thin membranes that may consist of a dense network of entangled CNT ropes (see Liu, J. et al., SCIENCE 280(5367) 1998, 1253-6). It is believed that buckypapers have some fire retardancy because buckypapers may reduce the transport of both combustibles and combustives. The dense network of nonflammable CNTs may act as a physical barrier to the diffusion of oxygen, and may slow the escape of combustion products from the decomposition of the polymer matrices. Previous results have shown that pure, unmodified multi-walled carbon nanotube buckypapers, when used as a fire shield, increase the time to ignition (TTI) of an epoxy/carbon fiber composite from 46 to 64 seconds (see Wu, Q. et al., CARBON 48(6) 2010, 1799-806). There is a need, however, to improve the existing buckypaper fire shields.

Magnesium hydroxide (MDH) particles have some fire retardant capability. In the past, MDH particles have been utilized as a fire retardant additive by being incorporated in a polymer matrix as a filler (see Huang, H., et al., J. APPL. POLY. SCI. 100(6), 2006, 4461-9; Gui, H. et al., POLYMER 48(9), 2007, 2537-41; Gui, H., et al., COMPOSITES SCI. & TECH. 67(6), 2007, 974-80; Lv., et al., J. APP. POLY. SCI. 105(2), 2007, 333-40). Nano-sized MDH particles have been shown to be more effective as compared to larger particle sizes (see Huang, H., et al., J. APPL. POLY. SCI. 100(6), 2006, 4461-9). However, these known methods require high-weight loading (generally more than 60%) to achieve satisfactory fire retardancy. This high-weight loading often is undesirable—especially since the high concentration of particles may give rise to processing issues and/or deteriorate the mechanical properties of composites (see Wang, J. et al., J. APP. POLY. SCI. 60(9), 1996, 1425-37).

Therefore, fire retardant materials that overcome at least one or all of the above-described disadvantages are desirable.

SUMMARY

In one aspect, a fire retardant material comprising CNTs and particles is provided. In one embodiment, the particles are dispersed in a CNT network.

In one embodiment, the CNT network comprises a network of entangled CNTs, commonly referred to as a buckypaper. The CNT network or buckypaper, in some embodiments, may comprise single-walled carbon nanotubes (SWNTs), multi-walled nanotubes (MWNTs), carbon nanofibers, or a combination thereof.

In some embodiments, the particles may comprise any particle that endothermically reacts or decomposes when exposed to elevated temperatures—for example, heat or a flame. In one embodiment, the particles are nanoparticles. In one particular embodiment, the particles may comprise more than one type of particle.

In another aspect, methods are provided for making fire retardant materials comprising CNTs and particles. In one embodiment, the fire retardant materials are made by dispersing CNTs and particles in a solution, and then removing the solution through a filter to form a membrane.

In yet another aspect, methods are provided for improving the fire retardation capability of a material. In some embodiments, the methods comprise arranging a first buckypaper layer on a first surface of a material, arranging on the first buckypaper layer a layer of a first fire retardant material comprising CNTs and at least one type of particles capable of endothermically reacting or decomposing when exposed to elevated temperatures. In some embodiments, one or more additional fire retardant materials also may be applied to the material.

DETAILED DESCRIPTION

Figure 1:
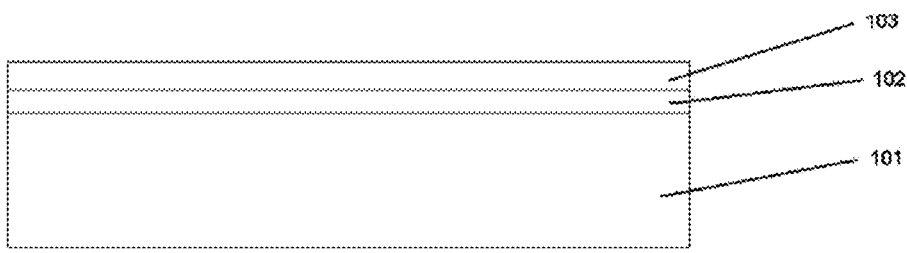
FIG. 1 is a cross-sectional view of one embodiment of a material onto which a buckypaper and a fire retardant material are arranged.

In one aspect, a fire retardant material is provided that comprises CNTs and particles.

Carbon Nanotubes (CNTs)

The CNTs used in the fire retardant materials may comprise SWNTs, MWNTs, carbon nanofibers, or a combination thereof. In other embodiments, the fire retardant materials contain SWNTs only. In another embodiment, the fire retardant materials contain MWNTs only. In yet another embodiment, the fire retardant materials contain carbon nanofibers only. In still yet another embodiment, the fire retardant materials contain a combination of SWNTs and MWNTs; SWNTs and carbon nanofibers; MWNTs and carbon nanofibers; or SWNTs, MWNTs, and carbon nanofibers.

In one embodiment, the fire retardant materials comprise a CNT network. In a particular embodiment, the CNT network comprises a network of entangled CNTs, commonly referred to as a buckypaper. As used herein, the term "hybrid buckypaper", or HBP, refers to fire retardant materials comprising a CNT buckypaper and at least one type of particles.

Not wishing to be bound by any particular theory, it is believed that buckypapers advantageously may provide a large specific surface area that may allow for efficient immobilization of dispersed particles, including nanoparticles. Furthermore, buckypapers' high thermal conductivity may also facilitate rapid and more uniform heat spread and particle decomposition, which beneficially may avoid the formation of hot spots, which can, in certain instances, cause structural breakdown.

Particles

Generally, any particles that reduce one or more of the essential elements that sustain the combustion cycle may be used in the fire retardant materials. In one embodiment, the particles are capable of endothermically reacting or decomposing when exposed to elevated temperatures. In some embodiments, the particles are capable of endothermically reacting or decomposing at temperatures greater than 300° C.

In some embodiments, more than one type of particles may be used. In certain embodiments, the particles are nanoparticles. In one embodiment, the nanoparticles range in size from about 5 nm to about 50 nm. In another embodiment, the nanoparticles range in size from about 5 nm to about 20 nm.

In some embodiments, the particles comprise an inorganic hydrate, a metal hydroxide, a carbonate, or a combination thereof. For example, the particles may comprise magnesium hydroxide particles ("MDH"), aluminum hydroxide, dawsonite, potassium aluminate, calcium hydroxide, zinc borate, Kaolin clay, calcium carbonate, calcium sulfate dihydrate, sodium hydrogen carbonate, or a combination thereof. In one particular embodiment, the particles are MDH nanoparticles.

In some embodiments, the materials and methods herein allow for a reduction in the weight percentage of particles required to achieve satisfactory fire retardation without substantially altering the standard buckypaper manufacturing process and/or jeopardizing other properties of the buckypaper in which the particles are dispersed. In other embodiments, the buckypapers support a loading of about 100 to about 150 weight percent of particles without suffering a substantial loss of structural integrity.

In some embodiments, the fire retardant materials comprise 40% by weight of particles or less. In a further embodiment, the fire retardant materials comprise 35% by weight of particles or less. In still a further embodiment, the fire retardant materials comprise 30% by weight of particles or less. In an additional embodiment, the fire retardant materials comprise 25% by weight of particles or less. In an alternative embodiment, the fire retardant materials comprise 20% by weight of particles or less. In another alternative embodiment, the fire retardant materials comprise 15% by weight of particles or less. In still another alternative embodiment, the fire retardant materials comprise 10% by weight of particles or less.

In some embodiments, the fire retardant materials comprise from about 100% to about 150% by weight of particles. In another embodiment, the fire retardant materials comprise from about 100% to about 125% by weight of particles. In a further embodiment, the fire retardant materials comprise from about 125% to about 150% by weight of particles. In yet another embodiment, the fire retardant materials comprise from about 115% to about 135% by weight of particles. In a still further embodiment, the fire retardant materials comprise from about 140% to about 150% by weight of particles. In certain embodiments, the fire retardant materials comprise from about 145% to about 150% by weight of particles. In particular embodiments, the lire retardant materials comprise from about 100% to about 110% by weight of particles. In an alternative embodiment, the fire retardant materials comprise from about 100% to about 105% by weight of particles.

In a particular embodiment, MDH nanoparticles may be combined with an MWNT buckypaper to form an HBP.

In some embodiments, the MDH nanoparticles may be dispersed throughout the CNT network. In this and other embodiments, the dispersement of particles throughout the CNT network may be confirmed using the techniques described herein, including scanning electron microscopy (SEM) and energy dispersive x-ray spectroscopy (EDS).

When heated above 340° C., MDH decomposes to form magnesium oxide and water vapor with a heat of absorption of 1300 J/g (i.e., the reaction is endothermic). The other particles disclosed herein perform similarly. Therefore, not wishing to be bound by any particular theory, it is believed that the HBPs disclosed herein—as a skin/protective layer—have the potential to improve the fire-retardant properties of various materials, including delay in ignition, slower heat and smoke release, and self-extinguishing behavior.

Furthermore, lowering the temperature of the HBP itself may improve the survivability of the HBP by delaying the breakdown of the HBP's CNT network from thermal oxidation (see Wu, Q. CARBON 46(8), 2008, 1164-5). The evolved water vapor from the decomposition of the particles, in certain embodiments, may also act as a fire inhibitor and diluent for the combustion in the gas phase. When HBPs comprising MDH particles are used, the spread of fire may further be inhibited by the formation of an inert magnesium oxide (MgO) layer, which may work cooperatively with the CNT network to enhance impediment of transport of decomposed volatiles and air.

Methods for Making Fire Retardant Materials

In another aspect, methods for making fire retardant materials comprising CNTs and particles are provided. Generally, the CNTs and particles are physically associated with one another to form a fire retardant material. Typically, the particles may be physically associated with the CNTs in any way that improves the fire retardancy of the resulting material.

In one embodiment, the particles may be dispersed evenly in a CNT network. In yet another embodiment, the particles may be dispersed unevenly throughout a CNT network. In still another embodiment, the particles may be disposed on the exterior of a CNT network. In one embodiment, the CNT network comprises a buckypaper. In one embodiment, the particles are both dispersed throughout a buckypaper and affixed onto at least one exterior surface of the buckypaper.

In one embodiment, the fire retardant materials may be made by dispersing CNTs and particles in a solution, and filtering the solution. In some embodiments, the fire retardant materials a membrane. In certain embodiments, the membrane may be dried after filtering. In still other embodiments, the membrane may be removed—by peeling, for example—from the filter used to remove the solution. In some embodiments, a binder may be applied to at least a portion of the membrane before it is removed from the filter.

Generally, the binder may be any material that eases the removal of the membrane from the filter, increases the structural integrity of the membrane, or both. In one embodiment, the binder is a polymeric binder. Examples of polymeric binders include polyvinyl alcohol, cellulose derivatives (e.g., cellulose acetate hydrogen phthalate, cellulose acetate butyrate, cellulose triacetate), polycarbonate, poly(styrene-co-acrylonitrile), a poly(sulfone), or poly(phenylene oxide).

Generally, any liquid that is capable of forming a filterable dispersion may be used to form the solution of CNTs and particles. In some embodiments, the liquid is an organic liquid. In one particular embodiment, the liquid is isopropyl alcohol. In other embodiments, the liquid is an aqueous liquid. In certain embodiments, other additives may added to the solution comprising the CNTs and particles. Generally, the additives may include, but are not limited to, surfactants, fillers, antimicrobials, antioxidants, colorants, pigments, flame retardants, heat stabilizers, light stabilizers, lubricants, plasticizers, or a combination thereof.

Generally, any filter that will allow the liquid to pass while retaining the CNTs and particles may be used. In some embodiments, the filter is a microporous membrane.

Generally, filtration of the solution of CNTs and particles may be assisted by gravity and/or by applying a vacuum or other force.

Methods for Improving the Fire Retardation Capability of Materials

Also provided herein are methods for improving the fire retardation capability of materials. As used herein, the phrase "improving the fire retardation capability" means reducing a material's susceptibility to damage potentially imposed by exposure to elevated temperatures. In some embodiments, the methods comprise arranging a first buckypaper layer on a first surface of a material, arranging on the first buckypaper layer a layer of a first fire retardant material comprising CNTs and at least one type of particles capable of endothermically reacting or decomposing when exposed to elevated temperatures.

FIG. 1 depicts one embodiment of a material 101 onto which a layer of buckypaper 102 and a layer of fire retardant material 103 are arranged.

Generally, additional layers of fire retardant material may be added as needed. In some embodiments, the method further comprises arranging on the layer of the first fire retardant material a layer of a second fire retardant material. The first fire retardant material and the second fire retardant material, in some embodiments, have the same weight percentages of particles capable of endothermically reacting or decomposing when exposed to elevated temperatures. In other embodiments, the first fire retardant material and the second fire retardant material have different weight percentages of particles capable of endothermically reacting or decomposing when exposed to elevated temperatures.

In some embodiments, the first fire retardant material and second fire retardant material can have particle weight percentages ranging from 0.1% to about 150%. In one embodiment, one of the first or second fire retardant materials has a weight percentage of particles of 30% or less, and the other fire retardant material has a weight percentage of particles of from about 100% to about 150%. In other embodiments, at least one of the first or second fire retardant materials has a weight percentage of particles of about 15%. In another embodiment, at least one of the first or second fire retardant materials has a weight percentage of particles of about 50%. In further embodiments, at least one of the first or second fire retardant materials has a weight percentage of particles of about 50%. In alternative embodiments, at least one of the first or second fire retardant materials has a weight percentage of particles of about 85%. In yet another embodiment, at least one of the first or second fire retardant materials has a weight percentage of particles of about 100%.

Figure 2:
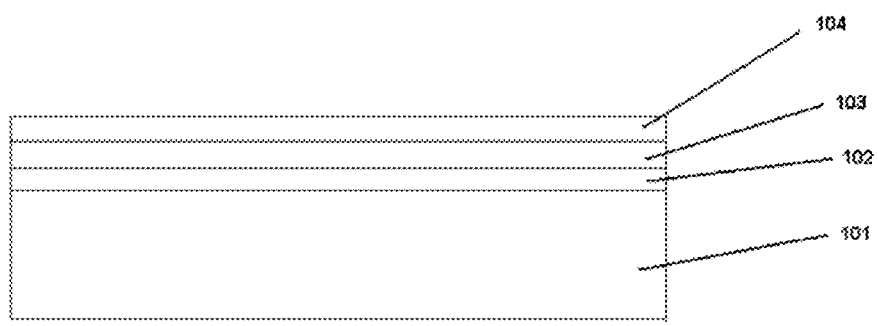
FIG. 2 is a cross-sectional view of one embodiment of a material onto which a buckypaper and two layers of fire retardant materials are arranged.

FIG. 2 depicts one embodiment of a material 101 protected by a buckypaper layer 102, a layer of a first fire retardant material 103, and a second fire retardant material 104.

Generally, the fire retardation capability of any material that may be exposed to elevated temperatures can be improved using the methods described herein. For example, the material may be a polymer matrix composite, such as a fiber reinforced composite. The material also may be of any shape. Typically, the first buckypaper layer and one or more layers of fire retardant materials are arranged on a surface of the material that may be exposed to elevated temperatures. If two or more surfaces of a material may be exposed to elevated temperatures, the buckypaper layer and one or more layers of fire retardant materials can be arranged on the two or more surfaces of the material.

Figure 3:
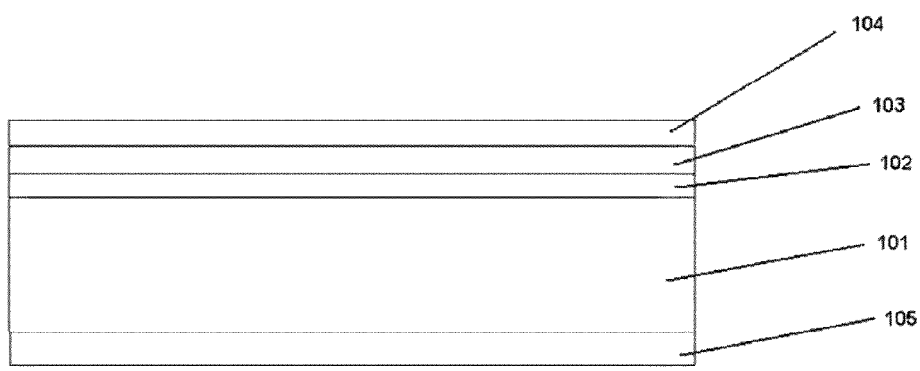
FIG. 3 is a cross-sectional view of one embodiment of a material having a buckypaper and two layers of fire retardant materials arranged on one surface, and a buckypaper arranged on a second surface.

In some embodiments, a second buckypaper layer may be applied to a second surface of the material. The second surface may be one that is not directly exposed to elevated temperatures, such as the surface that is opposite the first surface. FIG. 3 depicts one embodiment of a material 101 having a first surface that is protected by a buckypaper layer 102, a layer of a first fire retardant material 103, and a second fire retardant material 104. The material 101 in FIG. 3 also has a second surface on which a second buckypaper 105 is arranged.

In certain embodiments, the fire retardant materials described herein may be used to cover, protect, or shield any material. The fire retardant materials may be part of a composite material that is used as structural or building material in the transportation industries (e.g., automotive, aircraft, watercraft, etc.). In some embodiments, polymer matrix composites may be fabricated with integrated HBPs as a fire-shielding skin layer.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1

Preparation of Fire Retardant Materials with MWNTs and MDH Nanoparticles

Hybrid buckypapers were successfully fabricated MDH and MWNTs. As described below, the HBPs showed a dramatic improvement in fire retardance when compared to pure buckypaper, with a greater than six fold improvement in the time to catastrophic failure when 30% MDH was used.

MDH nanoparticles (particle size 5.8-20 nm by TEM) were purchased from Sigma Aldrich (St. Louis, Mo., USA) and the MWNTs purchased from CNano Inc. (San Francisco, Calif., USA). HBPs with different concentrations of MDH were prepared in this example. Specifically, HBPs with 10%, 20%, 30% MDH nanoparticles by total weight were prepared. As described below, HPBs with other percentages of MDH nanoparticles or other types or combinations of particles may be prepared by the methods described herein.

The desired amounts of MWNTs and MDH nanoparticles (indicated in Table 1) were dispersed in isopropyl alcohol using a high shear high impact microfluidic processor (Microfluidics Corp., M110-P). The suspension was then vacuum-filtered through a membrane. The HBPs were peeled from the membrane after drying. A buckypaper without MDH nanoparticles was also fabricated as a control material.

TABLE 1

Hybrid buckypaper fabrication recipes

| Sample | Weight % MDH | Mass of MWCNTs (mg) | Mass of MDH (mg) | Total Mass (mg) |
|---|---|---|---|---|
| HBP-MWNT | 0 | 90 | 0 | 90 |
| HBP-MWNT-10% MDH | 10 | 90 | 10 | 100 |
| HBP-MWNT-20% MDH | 20 | 90 | 22.5 | 112.5 |
| HBP-MWNT-30% MDH | 30 | 90 | 38.6 | 128.6 |

Despite the differences in total mass of the HBPs, there were no appreciable differences in their thicknesses. This may suggest that most of the MDH nanoparticles were embedded within the buckypapers. Visually, no appreciable difference was observed between the two materials.

The same MDH particles were used to create a fire retardant material with a high weight loading of particles. The previously-described techniques were followed, with several exceptions. First, a 150% by weight loading of particles was placed in the solution with CNTs, along with Triton X surfactant (Sigma Aldrich, USA). Second, after the dispersion was formed via sonication, polyvinyl alcohol (PVA) was added to the filtered suspension. The PVA served as a binder, which enabled easier and faster removal of the HBP from the membrane.

Example 2

Characterization of Fire Retardant Material

The distribution of MDH nanoparticles throughout the CNT network of the HBPs in Example 1 was examined along the cross sections of the HBPs using a JEOL JSM-7401 F scanning electron microscope (SEM). The presence of MDH nanoparticles throughout the HBPs was analyzed by Energy Dispersive X-ray spectroscopy (EDS), which is widely used for element analysis.

EDS is based on the principle that the X-rays emitted by an atom upon being hit by charged particles (such as electrons beams in SEM) are characteristic of an element's atomic structure and can be used to uniquely identify one element from another.

To confirm the inclusion of MDH nanoparticles throughout the CNT networks, the cross section of several HBPs was observed by SEM. It appeared that the MDH nanoparticles were well dispersed, as only small amounts of aggregates (bright spots) were observed.

Due to the small particle size (5-20 nm), the nanoparticles of MDH are not discernible under the magnification used. However, the presence of the MDH nanoparticles throughout the HBPs was confirmed by Energy Dispersive X-ray spectroscopy (EDS). The entire cross section of the HBPs was scanned for elemental composition along a straight line.

The region of interest (ROI) counts for magnesium along the line were recorded. The spectrum indicated a substantial presence of magnesium throughout the cross-section. Due to the rough and porous nature of the surface, this intensity profile may not be suitable for quantitative analysis. Nevertheless, both EDS and SEM observation suggested that with the dispersion and fabrication technology employed, HBPs were successfully fabricated with MDH nanoparticles well-dispersed and distributed throughout the CNT network.

Example 3

MDH Nanoparticle Decomposition and Heat Absorption

Thermo-gravimetric analysis (TGA) (TA Instruments Q50-0181) was performed to investigate the decomposition of MDH nanoparticles in the HBPs. Heat absorption was studied using differential scanning calorimetry (DSC) (TA Instruments Q100-0158).

Figure 4:
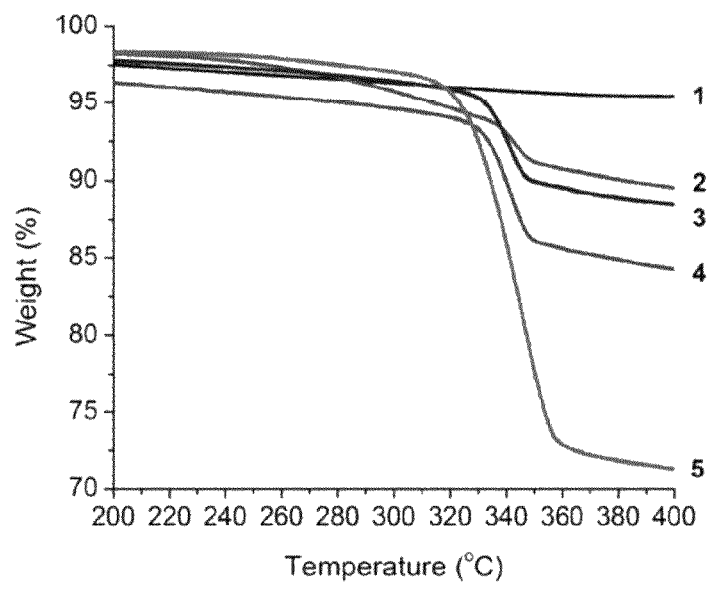
FIGS. 4($a$) and ($b$) are graphs showing the thermogravimetric analysis (TGA) of several embodiments of fire retardant materials and a control material.
Figure 4:
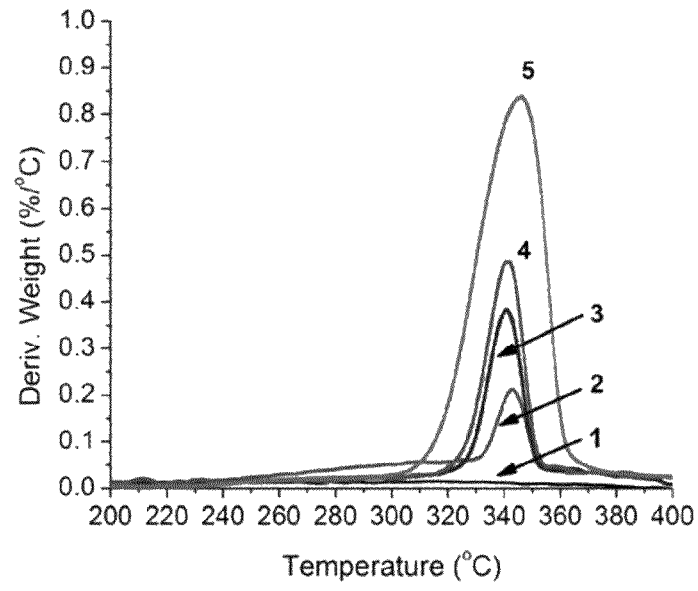

TGA was performed to investigate the decomposition of MDH nanoparticles. FIG. 4 shows the results obtained for the buckypaper sample, the HBPs, and pure MDH nanoparticles: 1—MWCNT buckypaper, 2—10% HBP, 3—20% HBP, 4—30% HBP, 5—pure $Mg(OH)_2$. The pure MWNT buckypaper showed little weight loss over the temperature range.

The weight loss of the HBPs were more substantial and increased as the MDH nanoparticle content increased. In all cases in this particular example, the majority of the weight loss occurred between about 300 and about 400° C. with maximum weight loss at about 340 to about 350° C., which was similar to those of pure MDH nanoparticles. These observations confirmed that the weight losses in the HBP samples in this particular example were most likely due to the decomposition of the MDH nanoparticles.

Figure 5:
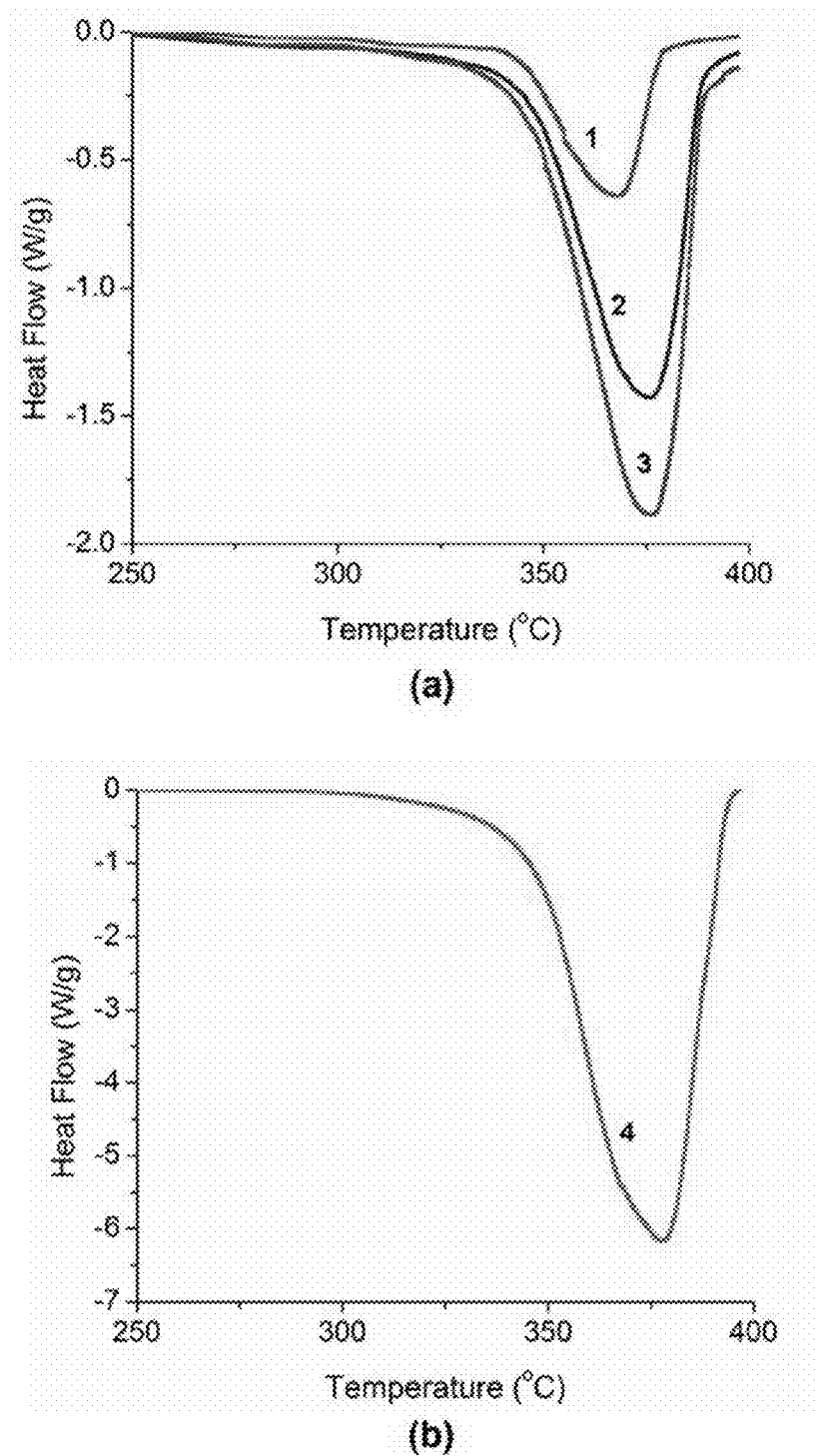
FIG. 5 is a graph of the heat absorption of several embodiments of fire retardant materials and a control material.

Differential scanning calorimetry was performed on the HBPs and the results are shown in FIG. 5(a): 1—10% HBP, 2—20% HBP, 3—30% HBP, 4—pure $Mg(OH)_2$. In each case, a strong endothermic peak was observed, and the peak temperature was very similar to that of pure MDH nanoparticles. This possibly suggests that the absorbed heat is associated with the decomposition of MDH nanoparticles in the HBPs.

The total heat was obtained by integration using TA Universal Analysis software. The values were 90.77, 232.3, and 304.0 $J\ g^{-1}$ for 10%, 20%, and 30% MDH nanoparticle weight loadings, respectively. FIG. 5(b) shows the results for the decomposition of pure MDH. The total heat absorbed was 1166 $J\ g^{-1}$, which is less than the literature value of 1300 $J\ g^{-1}$. This difference may be attributed to incomplete decomposition.

The amount of heat absorbed by the HBPs was converted to MDH weight based (i.e., J/g buckypaper and J/g MDH), and compared to that of pure MDH (Table 2). The heat absorption is significant and comparable to that of pure MDH. Not wishing to be bound any particular theory, the capability to absorb a large amount of heat during the decomposition of MDH nanoparticles may improve the fire retardant properties of the HBP.

TABLE 2

Summary of heat absorption during decomposition of magnesium hydroxide

| Sample | Total heat absorbed (J/g buckypaper) | Total heat absorbed (J/g MDH) |
|---|---|---|
| 5 MDH | N/A | 1166 |
| 2 HBP-MWNT-10% MDH | 90.77 | 907.7 |
| 3 HBP-MWNT-20% MDH | 232.3 | 1161.5 |
| 4 HBP-MWNT-30% MDH | 304 | 1013.3 |

TGA and DSC both confirmed the decomposition of magnesium hydroxide in the HBPs and heat absorption under elevated temperatures. The HBPs containing MDH nanoparticles showed significantly improved fire retardant properties as compared to a pure carbon nanotube buckypaper without MDH nanoparticles. Not wishing to be bound by any particular theory, it is believed that the endothermic decomposition of MDH may delay the rise of the buckypaper surface temperature and the resulting carbon nanotube network breakdown from oxidative degradation.

Figure 6:
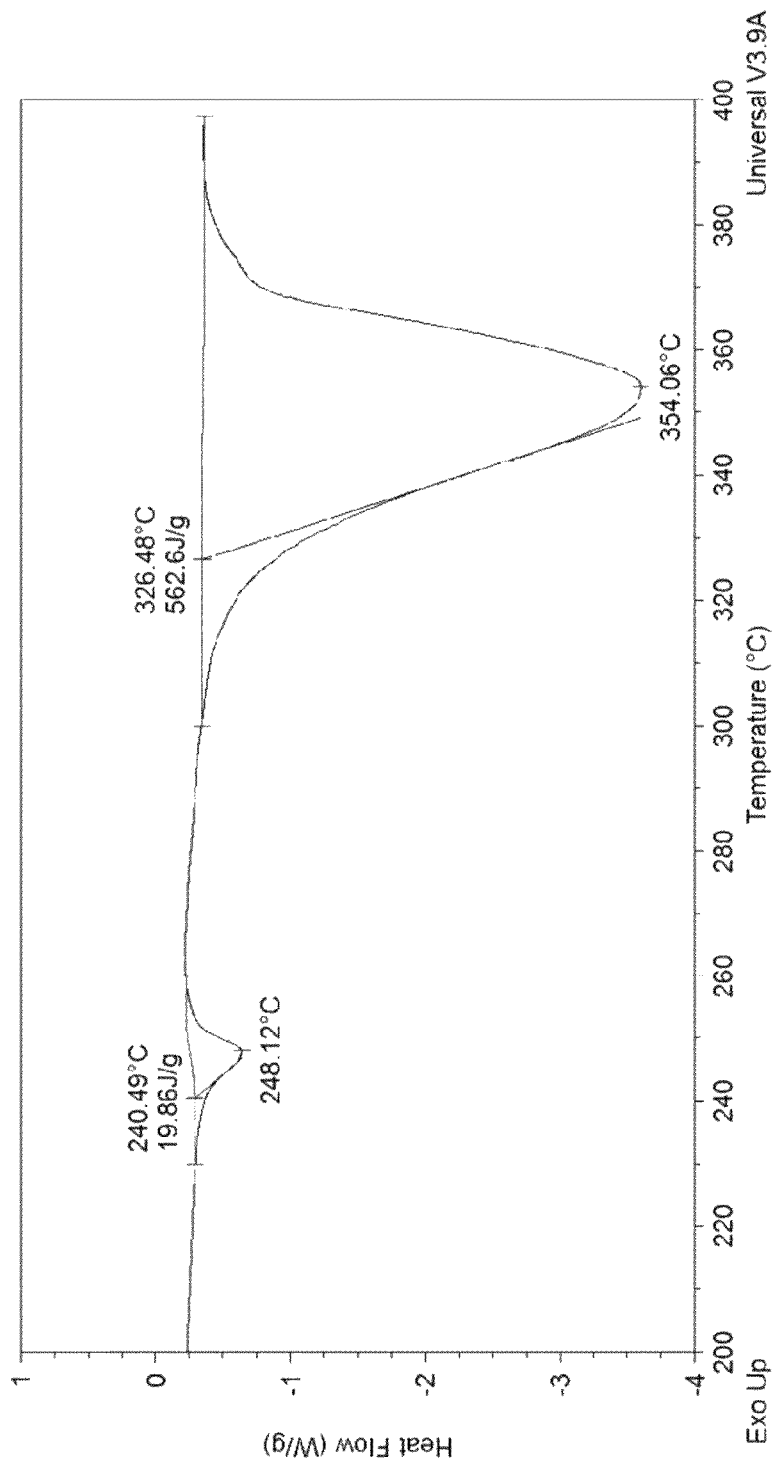
FIG. 6 is a graph of a differential scanning calorimetry (DSC) test performed on one embodiment of a material.

The fire retardant material with a 150 weight percent loading of MDH particles was also tested. The higher loading of MDH particles in the fire retardant material increased the material's fire retardation capabilities. FIG. 6 shows the results of a DSC test performed on the material. The small peak represented heat absorbed during the decomposition of PVA, while the large peak represented the absorption of heat associated with the decomposition of the MDH particles. The total heat of this peak (563 J/g) confirmed the increased presence of MDH compared to the material containing 30 weight percent loading of MDH.

Example 4

Fire Retardancy of HBPs

The fire retardancy of the HBPs were tested using a laboratory set up. The samples were suspended above a flame source and the distance between the samples and flame source, as well as the intensity of the flame were kept constant.

Figure 7:
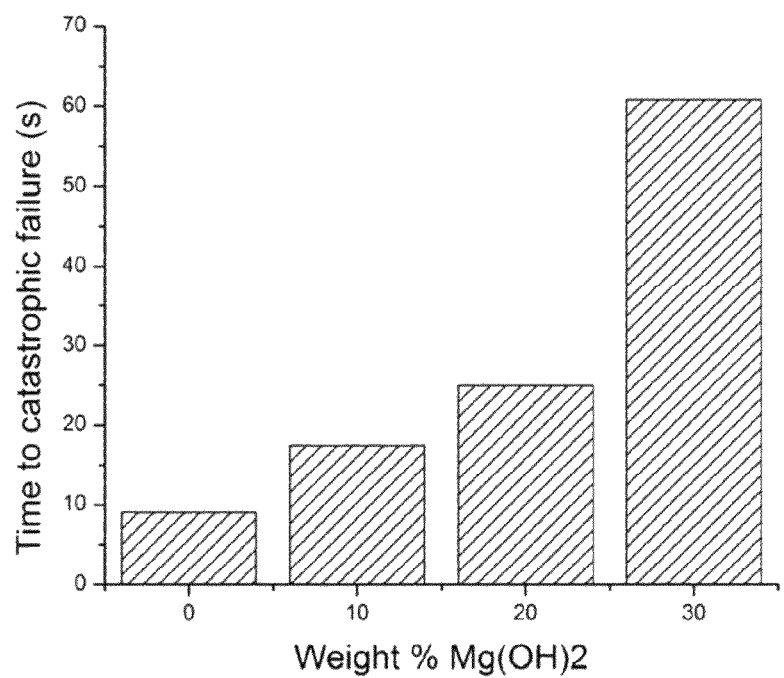
FIG. 7 is a graph of the time to catastrophic failure (TTCF) of various embodiments.

The time for the dense CNT network to break down and the flame to burst through the buckypaper and HBPs (defined as time to catastrophic failure, or TTCF) was measured. FIG. 7 shows the results. TTCF is closely associated with time-to-ignition (TTI) and had a substantial influence of the heat release rate (HRR), if the buckypaper or HBP is to be integrated into a composite panel as the skin layer. For the pure buckypaper, the TTCF was 9.1 seconds. The time increased to 17.5 and 25.0 seconds for the HBPs with 10% and 20% MDH nanoparticle weight loadings, respectively.

This represented improvements of 93% and 275%, respectively. For the HBP with 30% by weight MDH nanoparticles, the result was even more remarkable with a TTCF of 60.8 seconds, an improvement of more than six fold.

These observations provide strong support that fire retardancy can be improved by implementing at least one fire retardant mechanism from CNT and/or magnesium hydroxide or other particles. Upon exposure to a flame, the temperature of the buckypaper would increase. Without magnesium hydroxide, it is believed that the temperature increases faster than without magnesium hydroxide, which leads to rapid oxidation of carbon nanotubes and the ultimate breakdown of the CNT network.

The situation is different in the HBPs, because of the present of magnesium hydroxide. Upon reaching the decomposition temperature of magnesium hydroxide, the removal of a large amount of heat by the magnesium hydroxide decomposition may slow down the rise in the temperature of the buckypaper and may protect the carbon nanotubes from oxidative degradation. Evidently, this effect may postpone carbon nanotube breakdown and increase TTCF.

Figure 8:
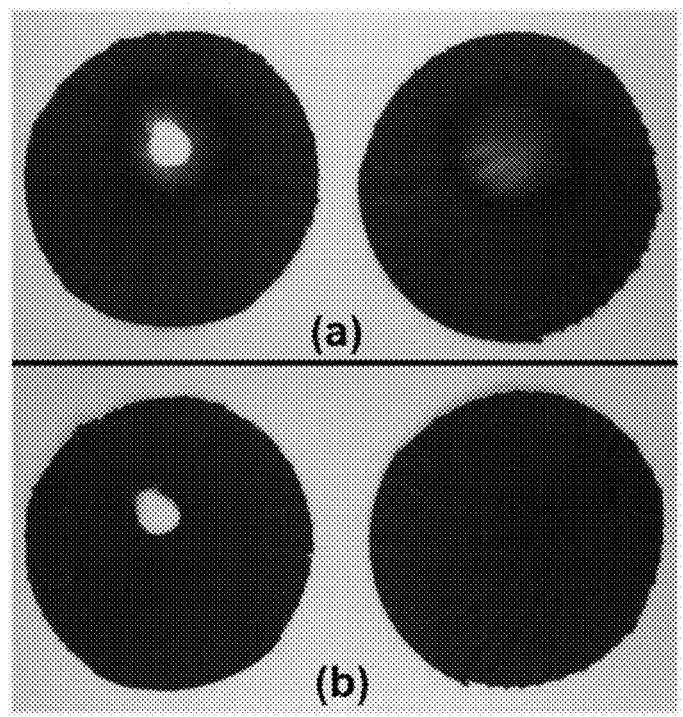
FIG. 8 is a photograph showing a pure buckypaper (left) and an embodiment of the fire retardant material exposed to flame for 15 seconds: (a) Bottom (flame side), (b) Top.

FIG. 8 shows the difference between the 30% Mg(OH) HBP (right) and pure buckypaper (left) when exposed to a flame for 15 seconds. The flame completely pierced through the pure buckypaper, while only the formation of a white film was observed on the bottom (flame side, FIG. 8(a) of the HBP. The top side is shown in FIG. 8(b).

Due to the special properties of the fire retardant materials described herein, including the HBPs, they may be used to shield, cover, or protect any material that is susceptible to combustion. The HBPs' ability to maintain structural integrity and remove heat from their carbon nanotubes network may significantly increase the time to ignition (TTI) and lower the heat release rate (HRR) of polymer matrix composites and other composites that are shielded, covered, or protected by the fire retardant materials described herein.

Example 5

Fire Retardancy of Composite Materials

A composite material was formed by placing an HBP layer on an epoxy carbon fiber composite. The epoxy used was Epon 862 (diglycidyl ether of bisphenol F) with curing agent EPICURE W (diethylene toluene diamine) (both from Miller-Stephenson Chemical Company, Inc., Danbury, Conn., USA). Twelve layers of IM-7 carbon fiber fabric (5HS weave, Hexcel) were used as the reinforcement.

The composites were fabricated by vacuum-assisted resin transfer molding. Three types of composites were fabricated for comparison purposes: (1) composite with no skin layer (C-NS), (2) composite with buckypaper skin layer (C-BPS), and (3) composite with HBP skin layer (C-HBPS). For C-BPS and C-HBPS, one layer of BP or HBP was placed at the bottom of the carbon fiber layers on a mold. After resin infusion, the composites were cured at 121° C. for 2 h at 177° C. for an additional 2 h and then cooled to ambient temperature.

For the composite with buckypaper skin layer (C-BPS) and composite with hybrid buckypaper skin layer (C-HBPS), the side with the skin was exposed to the flame for 65 s. Because of the significantly higher flammability, the sample with no skin layer (C-NS) was only exposed to the flame for 55 s.

Figure 9:
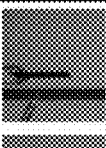
FIG. 9 is a series of photographs showing several embodiments of materials onto which fire retardant materials had been arranged at different intervals after the materials were exposed to a flame.

The fire progression for each sample was recorded, and FIG. 9 shows a series of snapshots of the samples at different burning times. C-NS ignited at 5 s (snapshot 9(b)), and C-BPS showed a delay in ignition at 7 s (snapshot 9(c)). In C-HBPS, ignition did not occur until 15 s (snapshot 9(d)), which is three times longer than the ignition time for C-NS and more than double that of C-BPS.

Furthermore, the burning of C-HPBS was not sustained. Despite being exposed to the flame source, the sample self-extinguished after only 9 s (at 24 seconds, (snapshot 9(e))) of burning and did not re-ignite until 12 s later (snapshot 9(f)). Neither C-NS nor C-BPS showed this characteristic, and both samples burned throughout the test. C-BPS did show much smaller size of flame (reduced HRR) than C-NS. The flame size (HRR) was further reduced for C-HBPS. This was most evident at 55 s when the flame source for C-NS was removed (snapshot 9(g)). By then, C-NS was essentially engulfed by the fire. The degree of fire spreading was reduced substantially in C-BPS, and further significant reduction was achieved in C-HBPS. Moreover, shortly after removal of the flame source (at 65 s (snapshot 9(h)), C-HBPS self-extinguished (at 73 s, snapshot 9(i)), whereas burning continued for C-BPS and C-NS. The C-HBPS also exhibited a significantly lower amount of smoke release.

Figure 10:
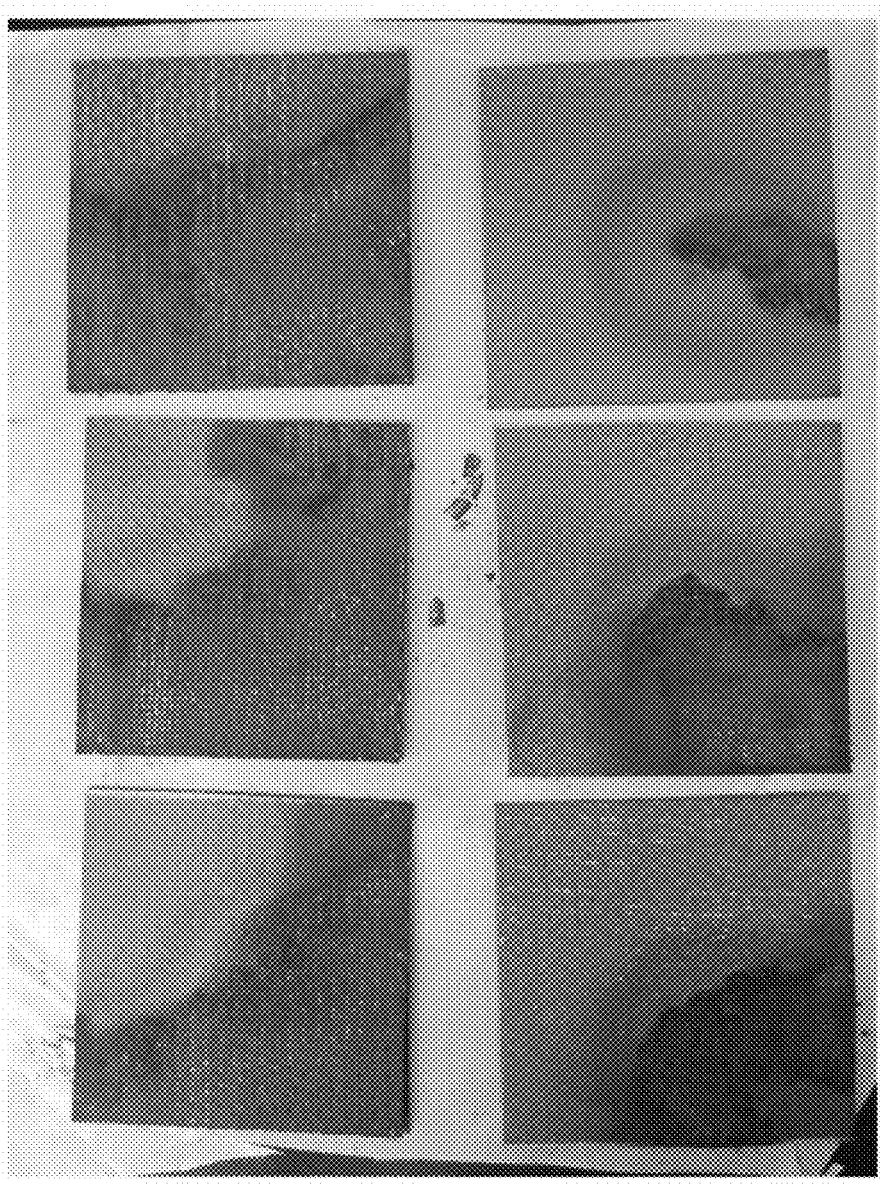
FIG. 10 is a photograph showing damage to control samples and several embodiments of protected materials after exposure to a flame.

In another test, two sheets of the fire retardant material containing a 150 weight percent loading of MDH particles from Example 1 were applied as a skin on a carbon fiber composite material. The fire retardant properties of the resulting samples were observed qualitatively using a propane torch. In FIG. 10, the top row of samples were the carbon fiber composite samples with no protective layer of fire retardant materials; the bottom row were the samples that were covered by the two sheets of the fire retardant material. FIG. 10 shows the remains of the samples after burning. The extent of fire damage to the unprotected samples was worse than the damage suffered by the samples protected two sheets of a fire retardant material containing a 150 weight percent loading of MDH.

We claim:

1. A fire retardant material comprising a membrane for application to a material in need of improved fire retardant capability, wherein the membrane comprises a carbon nanotube network and at least one type of particles capable of endothermically reacting or decomposing when exposed to elevated temperatures, wherein the at least one type of particles is physically associated with carbon nanotubes in the carbon nanotube network.

2. The fire retardant material of claim 1, wherein the concentration of the particles in the fire retardant material is 30% by weight or less.

3. The fire retardant material of claim 1, wherein the carbon nanotube network is loaded with an amount of particles from about 100% to about 150% by weight of the carbon nanotube network.

4. The fire retardant material of claim 1, wherein the at least one type of particles comprises nanoparticles.

5. The fire retardant material of claim 1, wherein the carbon nanotube network comprises a buckypaper.

6. The fire retardant material of claim 5, wherein the particles are dispersed evenly throughout the buckypaper.

7. The fire retardant material of claim 1, wherein the carbon nanotubes comprise single-wall carbon nanotubes, multi-wall carbon nanotubes, or a combination thereof.

\* \* \* \* \*